US007794108B2

(12) United States Patent
Lai

(10) Patent No.: US 7,794,108 B2
(45) Date of Patent: Sep. 14, 2010

(54) MULTI-IMAGE PRESENTATION BILLBOARD

(75) Inventor: Chih-Ming Lai, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 111 days.

(21) Appl. No.: 11/967,028

(22) Filed: Dec. 29, 2007

(65) Prior Publication Data

US 2009/0077845 A1 Mar. 26, 2009

(30) Foreign Application Priority Data

Sep. 21, 2007 (CN) ........................ 2007 1 0201805

(51) Int. Cl.
*G03B 25/02* (2006.01)
*F21V 11/00* (2006.01)

(52) U.S. Cl. ..................... 362/240; 362/97.3; 362/97.4; 40/454

(58) Field of Classification Search ......... 362/606–607, 362/612–613, 617, 619, 628, 97.1, 97.3, 362/97.4, 237, 240, 249.02, 249.06, 330, 362/332, 244, 249.14, 249.16, 812; 40/454; 359/619–620
See application file for complete search history.

(56) References Cited

U.S. PATENT DOCUMENTS 2,833,176 A 5/1958 Luis
5,748,828 A * 5/1998 Steiner et al. ............... 385/146
7,234,257 B2 * 6/2007 Bar-Yona ...................... 40/454
7,333,268 B2 * 2/2008 Steenblik et al. ............ 359/619
7,468,842 B2 * 12/2008 Steenblik et al. ............ 359/619
2005/0180020 A1 * 8/2005 Steenblik et al. ............ 359/626
2007/0058260 A1 * 3/2007 Steenblik et al. ............ 359/626
2009/0073568 A1 * 3/2009 Li et al. ...................... 359/620
2009/0147367 A1 * 6/2009 Blondal et al. .............. 359/619

FOREIGN PATENT DOCUMENTS

CN 2618249 Y 5/2004

* cited by examiner

*Primary Examiner*—Thomas M Sember
(74) *Attorney, Agent, or Firm*—Jeffrey T. Knapp

(57) ABSTRACT

A billboard (10) includes a substrate (11), a lens array (12) and at least one light source (13). A plurality of pattern units are provided at a first side of the substrate. Each of the pattern units includes a plurality of pattern cells for being selectively combined to form at least one independent image. The lens array corresponding to the pattern units is arranged on one surface of the substrate at the first side thereof. The lens array includes a plurality of lenses arranged in rows and columns. The lens array is configured for displaying the at least one independent image. At least one light source is disposed facing to the other surface of the substrate configured for emitting light rays towards the substrate.

18 Claims, 9 Drawing Sheets

MULTI-IMAGE PRESENTATION BILLBOARD

BACKGROUND

1. Technical Field

The present invention relates to advertising billboard devices and, particularly, to billboards capable of multi-image presentation.

2. Description of the Related Art

Billboards are used to display various messages typically consisting of a combination of text and graphics. Traditionally, the message has been provided by way of a single fixed sheet that is pasted to a backing. This traditional approach requires the use of an external tool to change the displayed message. Electronic billboards provide the advantage in that the display message can be conveniently changed without the use of an external tool. While the display message of electronic billboards can easily be changed, they are difficult to manage and often require significant support resources to coordinate billboard content.

What is needed, therefore, is a new billboard that can overcome the above-described shortcomings.

SUMMARY

The present invention relates to a billboard. The billboard includes a substrate, a lens array and at least one light source. A plurality of pattern units are provided at a first side of the substrate. Each of the pattern units includes a plurality of pattern cells for being selectively combined to form at least one independent image. The lens array corresponding to the pattern units is arranged on one surface of the substrate at the first side thereof. The lens array includes a plurality of lenses arranged in rows and columns. The lens array is configured for displaying the at least one independent image. At least one light source is disposed facing to the other surface of the substrate configured for emitting light rays towards the substrate.

The present invention relates to another billboard. The billboard includes a substrate, a lens array and at least one light source. The substrate has two opposite surfaces. A plurality of pattern units is formed on one surface of the substrate or formed in the substrate. Each of the pattern units includes a plurality of pattern cells for being selectively combined to form at least one independent image. The lens array includes a plurality of lenses arranged in rows and columns. The lens array corresponding to the pattern units is arranged on one surface of the substrate. The lens array is configured for displaying the at least one independent image. A wedge-shaped light guide plate is disposed facing the other surface of the substrate. The wedge-shaped light guide plate having an incident surface. At least one light source is disposed facing the incident surface of the wedge-shaped light guide plate.

Other novel features will become more apparent from the following detailed description when taken in conjunction with the accompanying drawings.

BRIEF DESCRIPTION OF THE DRAWINGS

Many aspects of the present billboard can be better understood with reference to the following drawings. The components in the drawings are not necessarily drawn to scale, the emphasis instead being placed upon clearly illustrating the principles of the present billboard. Moreover, in the drawings, like reference numerals designate corresponding parts.

DETAILED DESCRIPTION OF THE INVENTION

Reference will now be made to the drawings to describe in detail at least one preferred embodiment of the present billboard.

Figure 1:
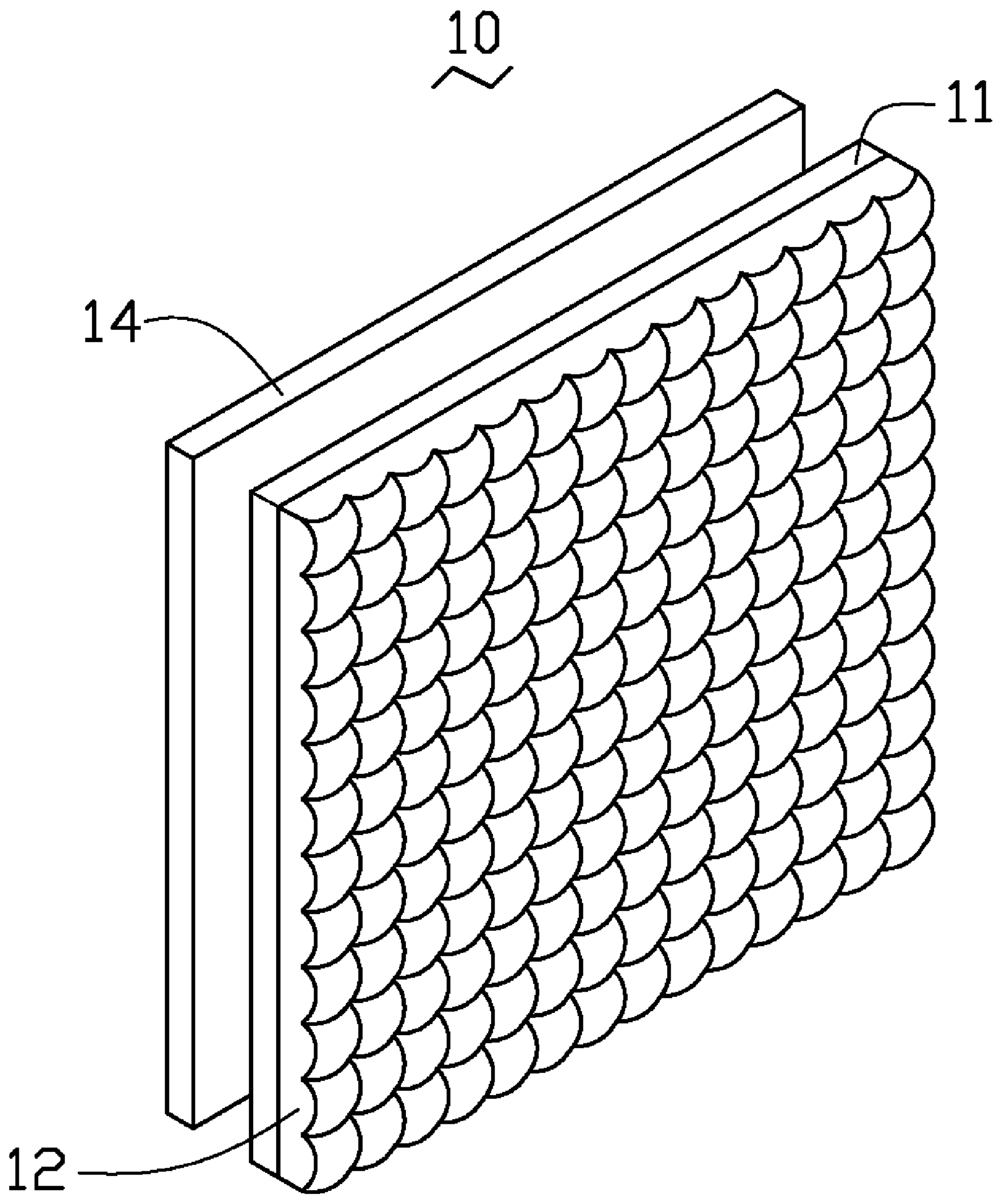
FIG. 1 is a schematic view of a billboard, in accordance with a first embodiment.
Figure 2:
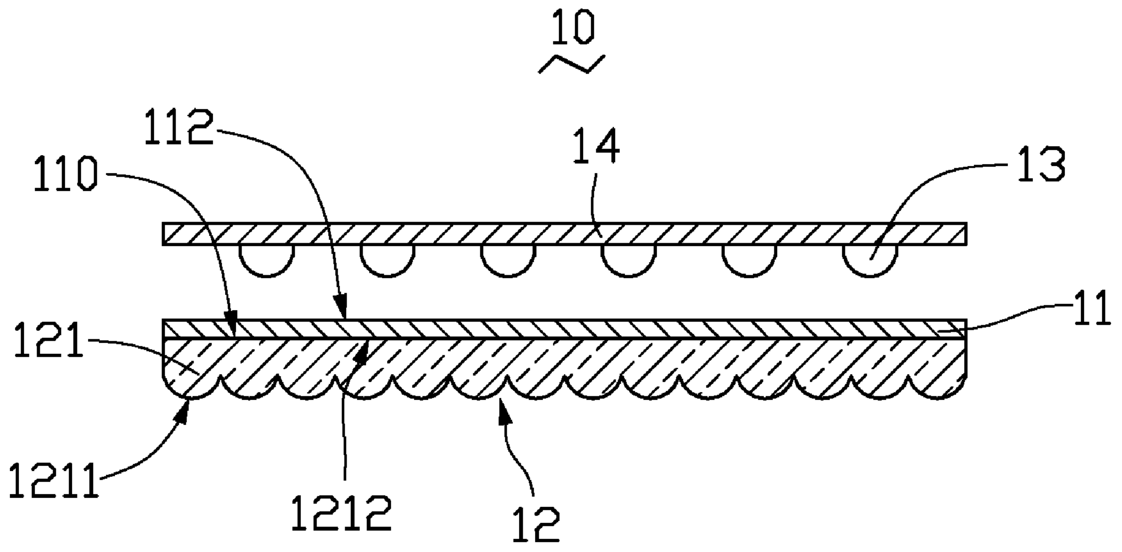
FIG. 2 is a schematic, cross-sectional view of the billboard in FIG. 1.

Referring to FIGS. 1 and 2, a billboard 10, according to a first present embodiment, includes a transparent substrate 11, a lens array 12, and at least one light source 13.

The transparent substrate 11 includes a first surface 110 and a second surface 112 located on the opposite side of the first surface 110. Referring to FIG. 2, in the present embodiment, the lens array 12 is arranged on the first surface 110 of the substrate 11, and the light sources 13 are located opposite to the second surface 112 of the substrate 11, i.e., the substrate 11 is located between the lens array 12 and the light sources 13. In the present embodiment, the light sources 13 are electrically and securely connected with a circuit board 14.

The light sources 13, in the present embodiment, are light emitting diodes (LEDs). The light sources 13 also can be other illuminating devices, such as cold cathode fluorescent lamps (CCFLs), etc.

Figure 4:
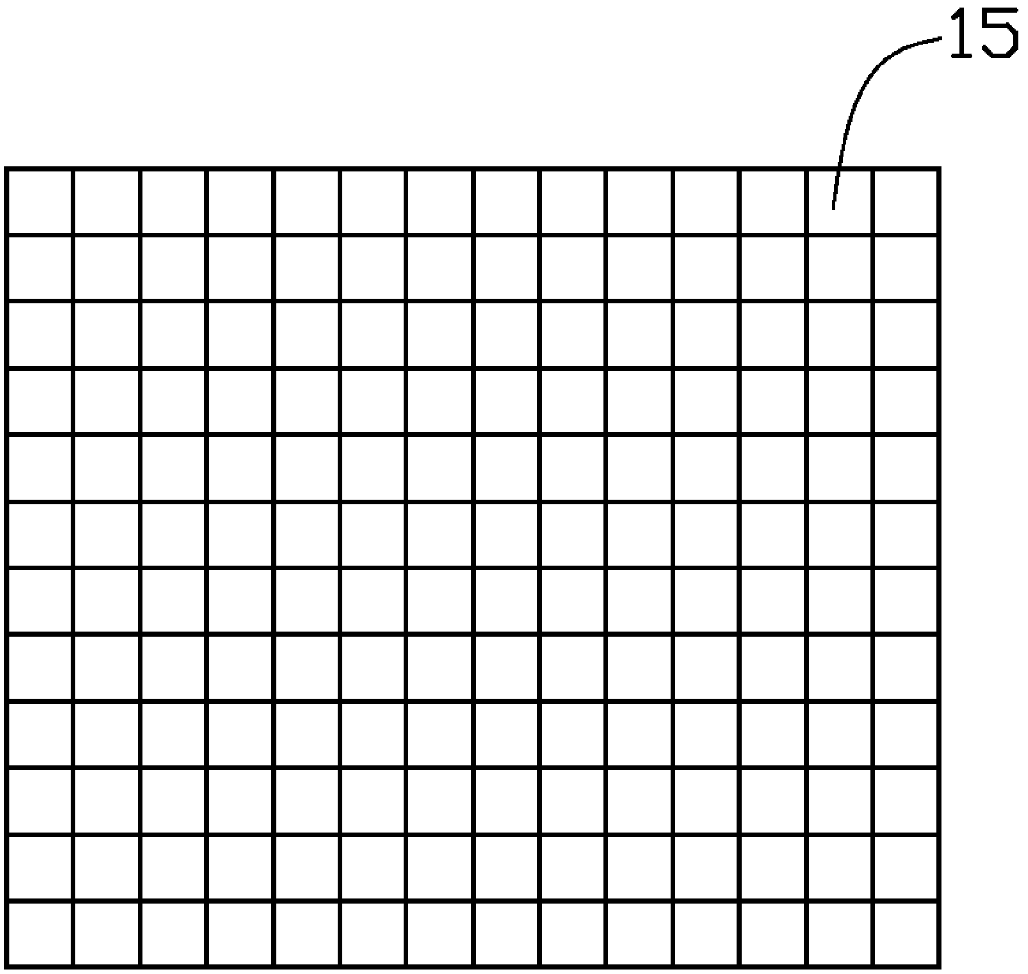
FIG. 4 is a sectional view of pattern units formed on the first surface of the substrate in FIG. 2.
Figure 5:
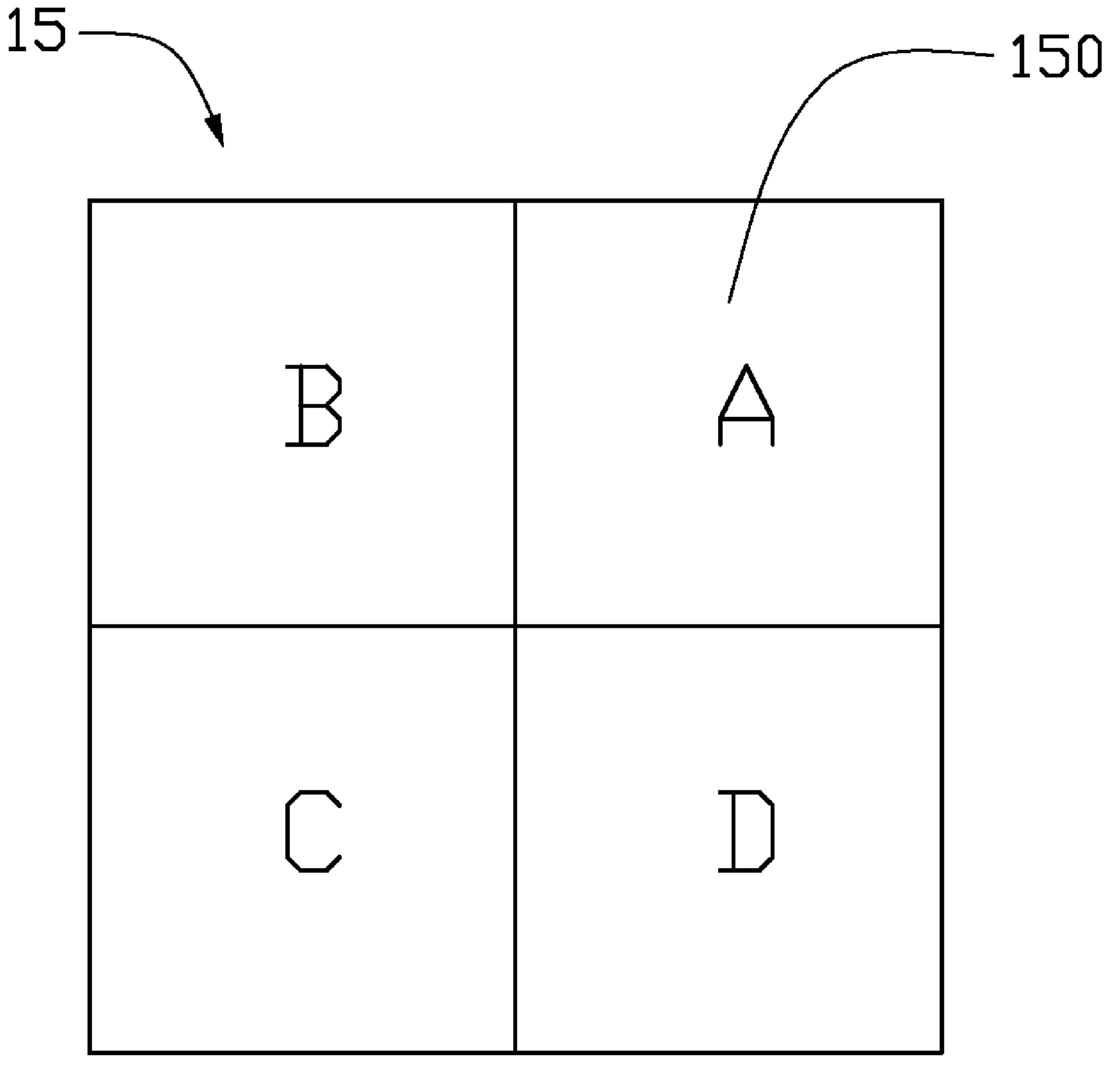
FIG. 5 is a sectional view of pattern cells in the pattern units illustrated in FIG. 4.

Referring to FIGS. 4 and 5, in the present embodiment, a plurality of pattern units 15 corresponding to the lens array 12 is formed on the first surface 110 of the substrate 11. Each of the pattern units 15 can be divided into a plurality of pattern cells 150. The pattern cells 150 of the pattern units 15 are carefully aligned, so that the plurality of pattern cells 150 of all of the pattern units 15 can be selectively combined to form a plurality of independent pictures each consisting of a combination of text and graphics. In alternative embodiments, the plurality of pattern units 15 can be formed on the second surface 112 of the substrate 11 or in the substrate 11.

Figure 3:
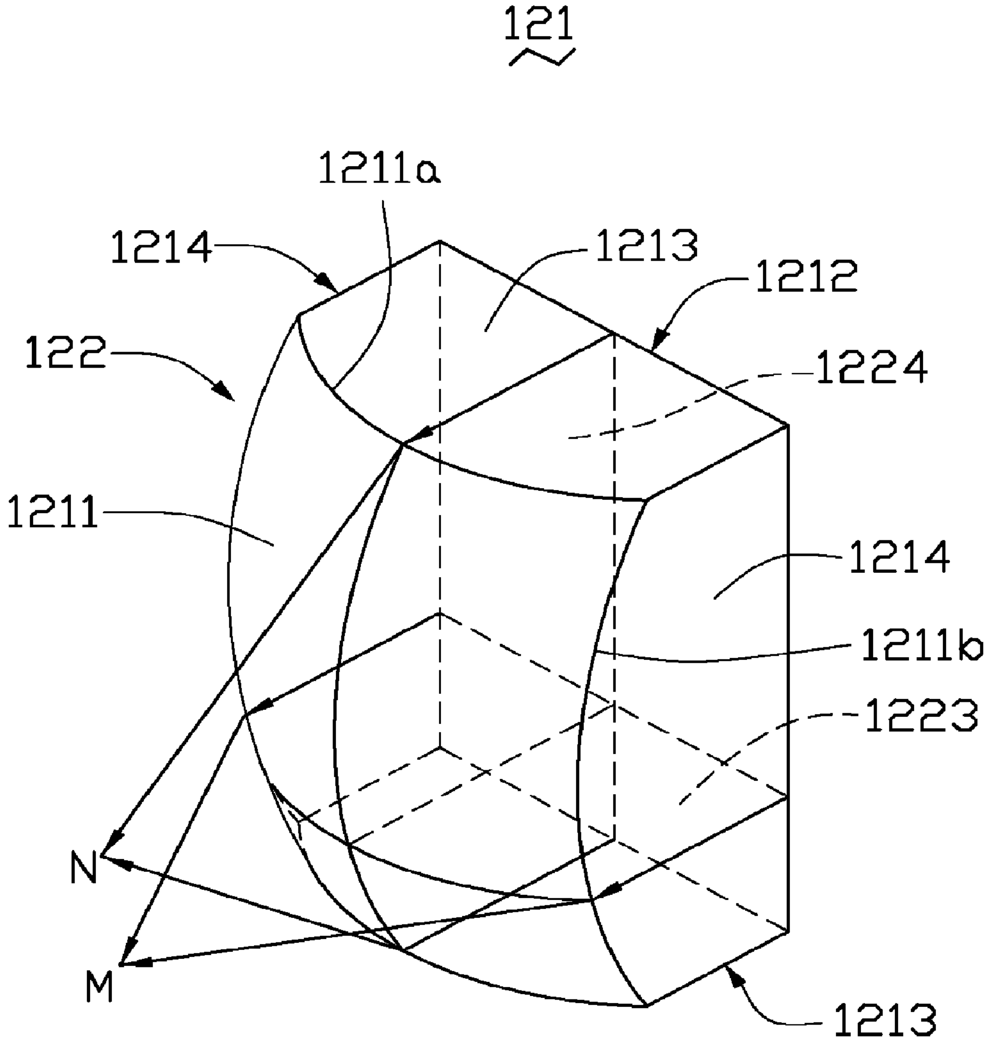
FIG. 3 is a schematic view of a lens in FIG. 1.

The lens array 12 includes a plurality of lenses 121 arranged in rows and columns. Referring to FIG. 3, each lens 121 includes a lens body 122. In the present embodiment, the lens body 122 is substantially shaped like a cube. In alternative embodiments, the lens body 122 can be in the shape of a cylinder or a prism. The lens body 122 has an incident surface 1212 and a light emitting surface 1211 opposite to the incident surface 1212. The lens body 122 further includes a pair of first side surfaces 1213 and a pair of second side surfaces 1214 adjacent to the first side surfaces 1213. The incident surface 1212 of each lens body 122 faces the first surface 110 of the substrate 11.

In the present embodiment, the incident surface 1212 of each lens body 122 is a plane surface. The light emitting surface 1211 of each lens body 122 is a curved surface, preferably, a second-order surface. In the present embodiment, the light emitting surface 1211 is an ellipsoid surface.

In alternative embodiments, the light emitting surface 1211 can be a hyperboloid surface or a paraboloid surface.

Referring to FIG. 3 again, a plane parallel to the first side surface 1213 of each lens body 122 is defined as a first reference surface 1223. A plane parallel to the second side surface 1214 of each lens body 122 is defined as a second reference surface 1224. The first reference surface 1223 is perpendicular to the second reference surface 1224. It can be understood that, parallel light rays transmitted to inside of the first reference surface 1223 can be focused at a first point M. In the same way, parallel light rays transmitted to inside of the second reference surface 1224 can be focused at a second point N. Therefore, different viewing angles will reveal different images of the pictures presented by the pattern cells 150.

Figure 6:
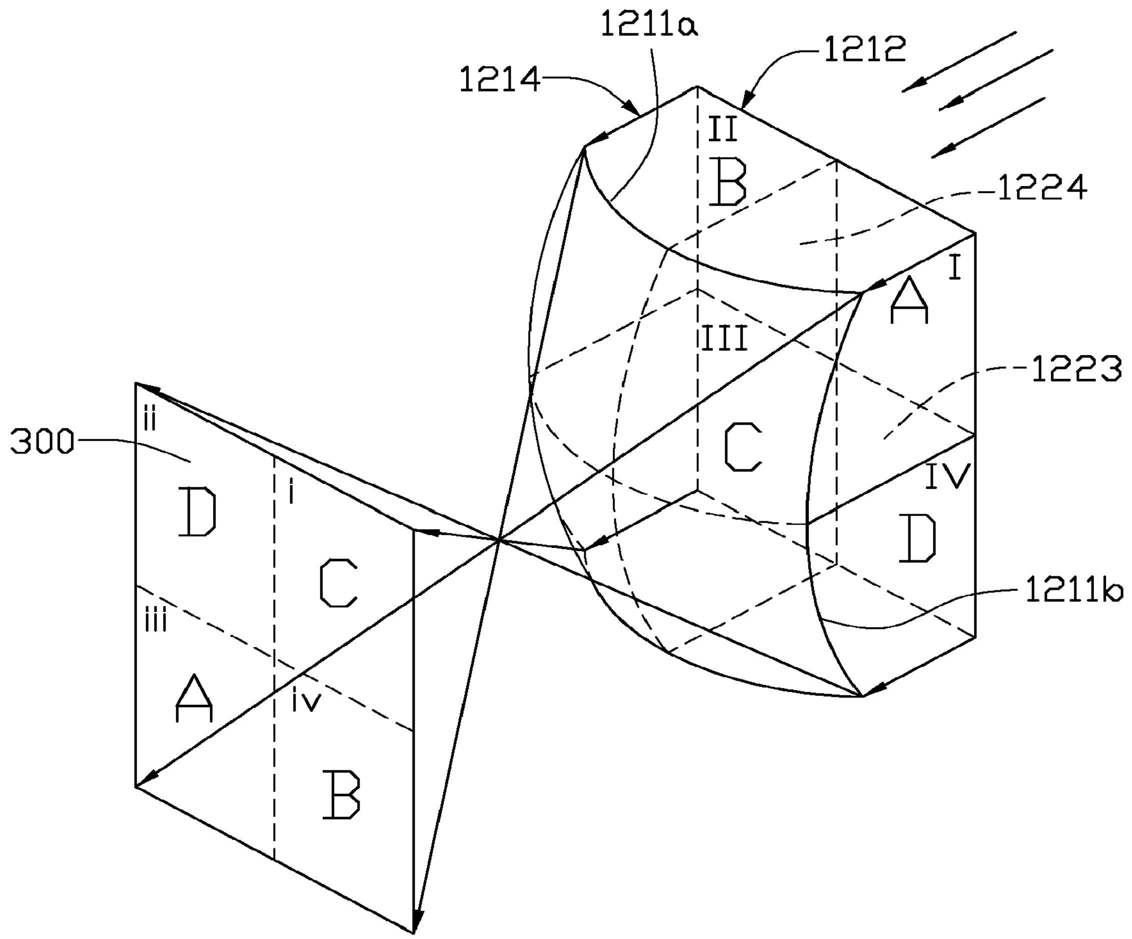
FIG. 6 is another schematic view of the lens in FIG. 3 when the incident surface of the lens is divided into four parts.

Referring to FIG. 6, for one example, the incident surface 1212 of each lens body 122 is divided into four equal-area parts I, II, III, IV by the first reference surface 1223 and the second reference surface 1224. The imaging plane 300 of each lens 12 is divided into four equal-area parts i, ii, iii, iv corresponding to the four parts I, II, III, IV of the incident surface 1212. The parts I of the incident surfaces 1212 of all the lens bodies 122 cooperatively constitute a first picture. The parts II of the incident surfaces 1212 of all the lens bodies 122 cooperatively constitute a second picture. The parts III of the incident surfaces 1212 of all the lens bodies 122 cooperatively constitute a third picture. The parts IV of the incident surfaces 1212 of all the lens bodies 122 cooperatively constitute a fourth picture.

In this example, each of the pattern units 15 consists of the pattern cells "A", "B", "C", and "D". There is substantially a one-to-one correspondence between the pattern cells "A", "B", "C", "D" and the parts I, II, III, IV of the incident surface 1212 of each lens body 122. In operation, referring to FIG. 2 and FIG. 6, the parallel light rays emitted from the light sources 13 are transmitted through the substrate 11 and illuminate the pattern cells "A", "B", "C", and "D" on the first surface 110 of the substrate 11. The transmitted light rays incident on the incident surface 1212 of the lens body 122 are refracted by the lens body 122 so that images of the pattern "A", "B", "C", and "D" are respectively formed on the imaging plane 300. Images of the patterns "A" and "B" are respectively formed on the part iii and the part iv of the imaging plane 300. Images of the patterns "C" and "D" are respectively formed on the part i and the part ii of the imaging plane 300.

In this way, images of the first picture, the second picture, the third picture, and the fourth picture will be observed from different positions or viewing angles.

In alternative embodiments, the transparent substrate 11 can be a transparent film.

Figure 7:
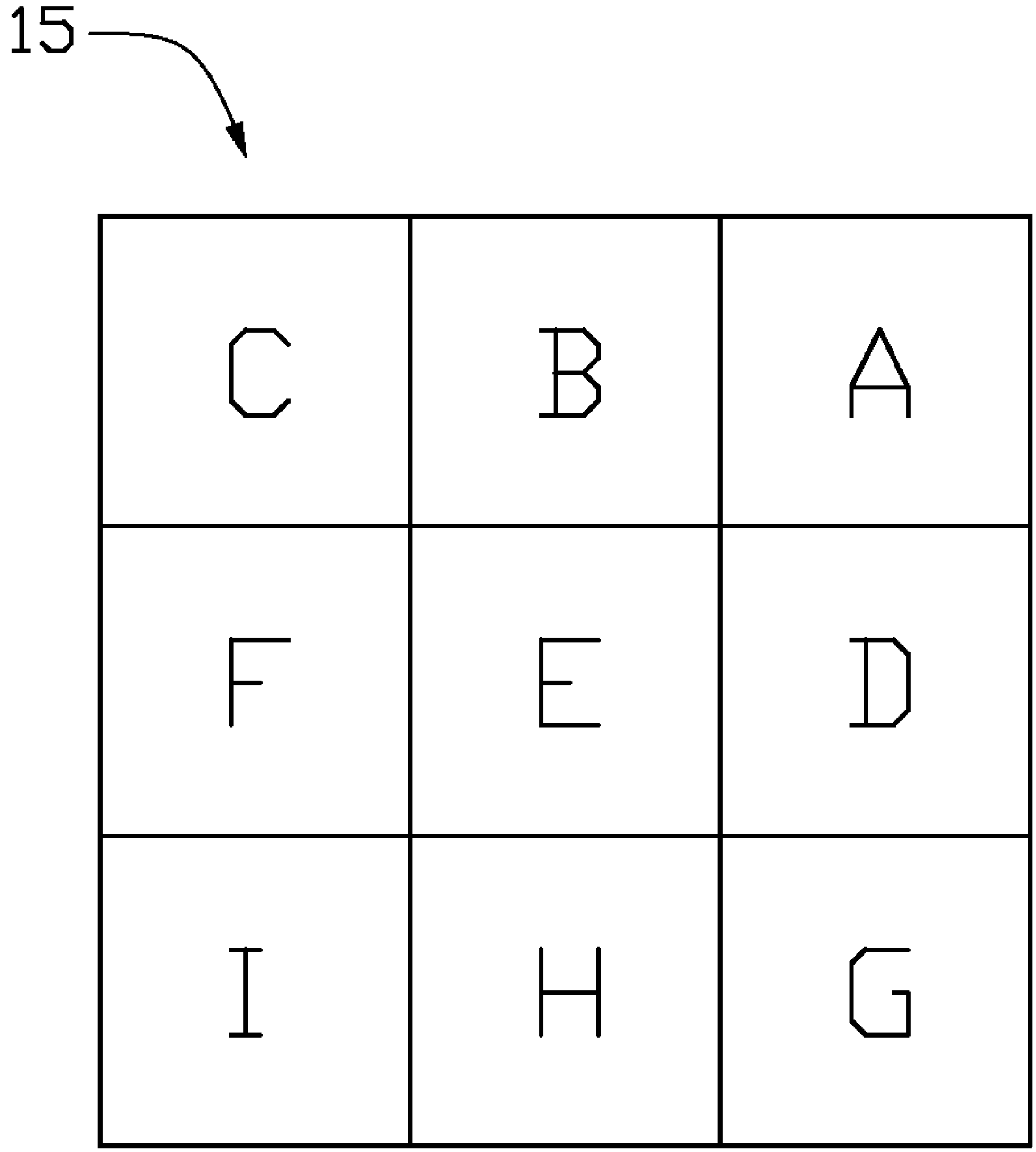
FIG. 7 is another sectional view of pattern cells in the pattern units illustrated in FIG. 4.
Figure 8:
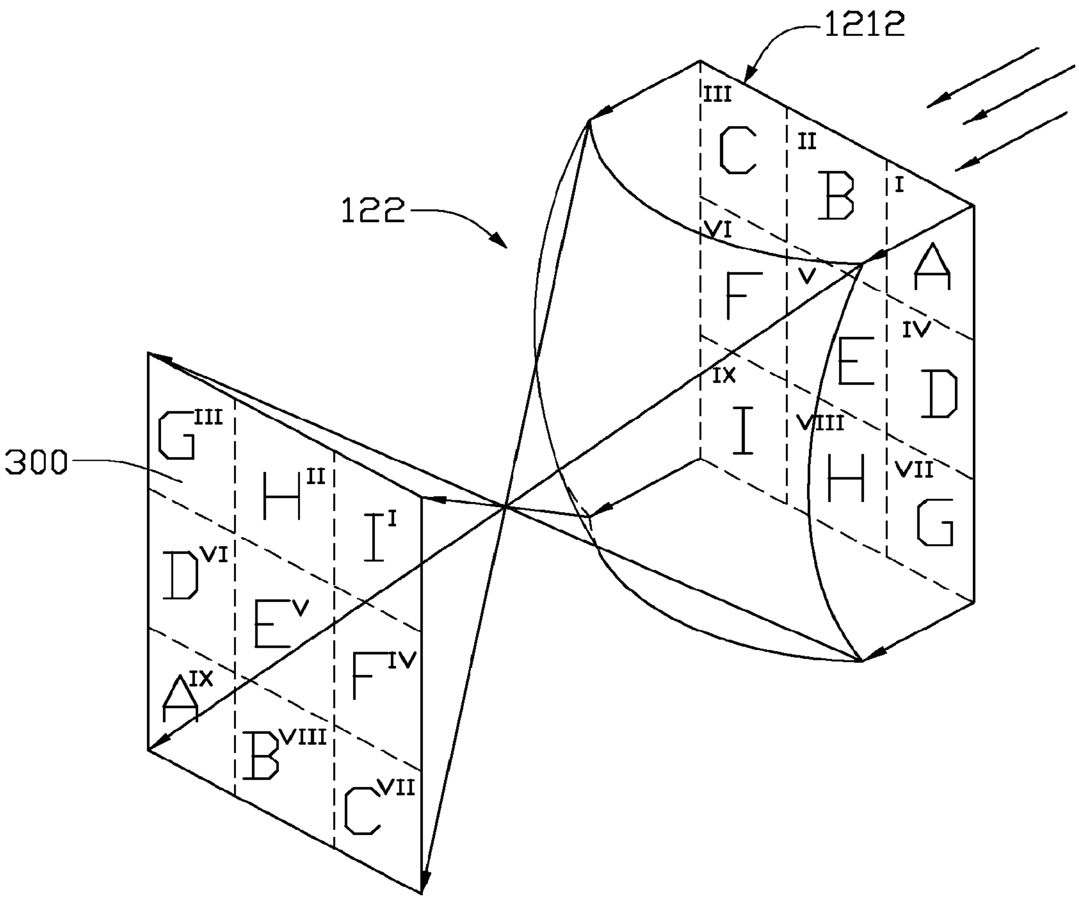
FIG. 8 is further another schematic view of the lens in FIG. 3 when the incident surface of the lens is divided into nine parts.

It can be understood that, the number of pattern cells 150 of each of the pattern units 15 is not limited to four, and can instead be three, six, etc. In another example, referring to FIG. 7, each of the pattern units 15 consists of the pattern cells "A", "B", "C", "D", "E", "F", "G", "H", and "I". Referring to FIG. 8, the incident surface 1212 is divided into nine equal-area parts I, II, III, IV, V, VI, VII, VIII, IX corresponding to the pattern cells "A", "B", "C", "D", "E", "F", "G", "H", "I", and the imaging plane 300 of each lens body 122 is divided into nine equal-area parts i, ii, iii, iv, v, vi, vii, viii, ix corresponding to the nine parts I, II, III, IV, V, VI, VII, VIII, IX of the incident surface 1212. Images of the patterns "A", "B", and "C" are respectively formed on the part ix, the part viii, and the part vii of the imaging plane 300. Images of the patterns "D", "E", and "F" are respectively formed on the part vi, the part v, and the part iv of the imaging plane 300. Images of the patterns "G", "H", and "I" are respectively formed on the part iii, the part ii, and the part i of the imaging plane 300.

Figure 9:
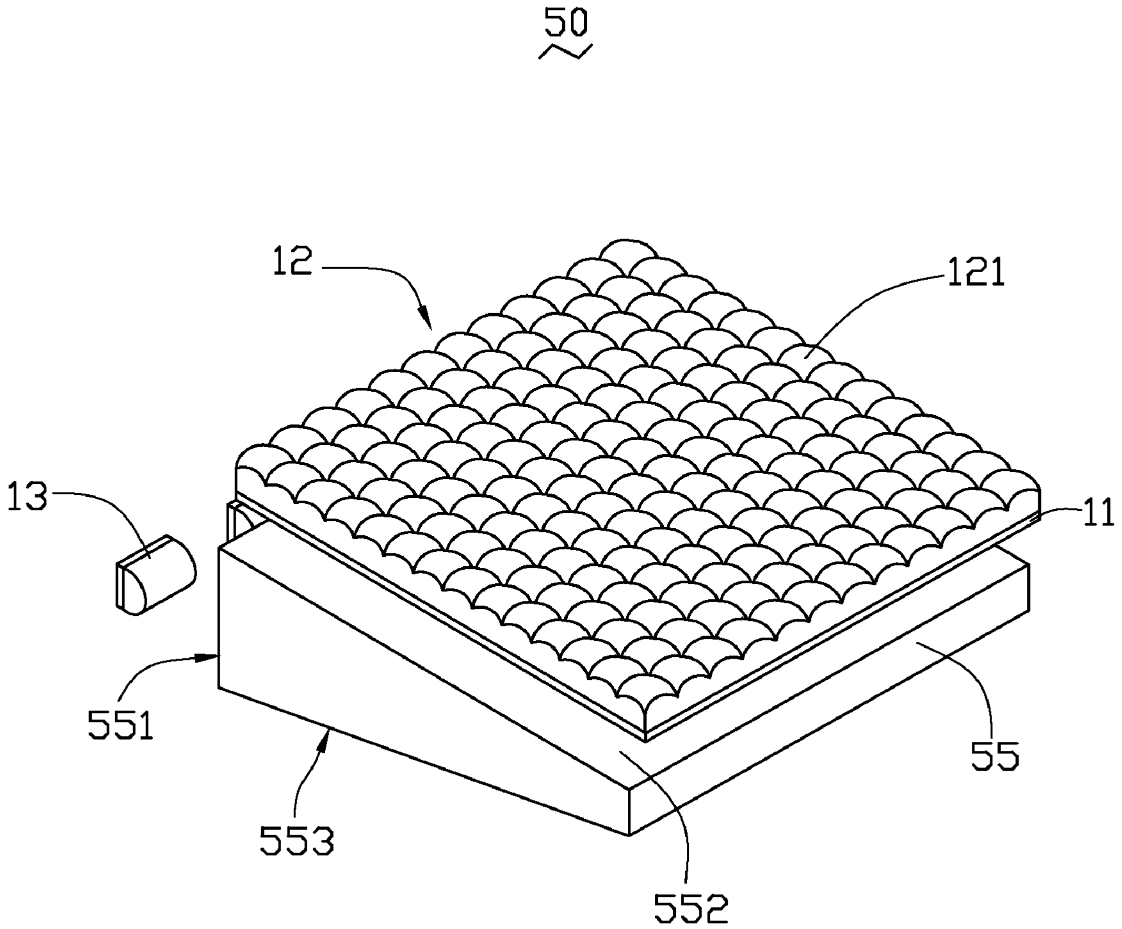
FIG. 9 is a schematic view of a billboard, in accordance with a second embodiment.

Referring to FIG. 9, a billboard 50, according to a second present embodiment, includes a transparent substrate 11, a lens array 12, and at least one light source 13. The structure of the billboard 50 in the second embodiment is similar to that of the billboard 10 in the first embodiment. The difference is that, the billboard 50 further includes a wedge-shaped light guide plate 55. The light guide plate 55 includes a top light emitting surface 552, a bottom surface 553, and an incident surface 551 located between the light emitting surface 552 and the bottom surface 553. The light emitting surface 552 faces the transparent substrate 11.

The billboards described in the embodiments are capable of multi-image presentation. Through the lens array 12, a plurality of patterns selectively combined by the plurality of pattern units on the substrate 11 can be observed from different positions or viewing angles.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Furthermore, this application is intended to cover such departures from the present disclosure as come within known or customary practice in the art to which the invention pertains and which fall within the limits of the appended claims or equivalents thereof.

What is claimed is:

1. A billboard, comprising:

a substrate;

a plurality of pattern units provided at a first side of the substrate, each of the pattern units comprising at least first, second, third and fourth pattern cells arranged in a matrix, the at least first pattern cells of the pattern units together forming a first picture, the at least second pattern cells of the pattern units together forming a second picture, the at least third pattern cells of the pattern units together forming a third picture and the at least fourth pattern cells of the pattern units together forming a fourth picture;

a plurality of light sources disposed at an opposite second side of the substrate and configured for emitting light rays toward the substrate; and a lens array corresponding to the pattern units arranged on one surface of the substrate at the first side thereof, the lens array displaying images of the first, second, third and fourth pictures at different viewing angles, respectively, wherein the lens array comprises a plurality of lenses arranged in rows and columns, and each of the lenses comprises a second-order surface through which the light rays are output from the lens and a planar surface thorough which the light rays enter the lens, the planar surface being located facing a corresponding pattern unit, the planar surface being divided by at least two reference surfaces in the each of the lenses into at least first, second, third and fourth parts which are arranged in a matrix and located corresponding to the at least first, second, third and fourth pattern cells of the corresponding pattern unit, the at least first and second reference surfaces having different focuses.

2. The billboard as claimed in claim 1, wherein the planar surface of each of the lenses is opposite to the second-order surface.

3. The billboard as claimed in claim 1, wherein the second-order surface of each lens is an ellipsoid surface.

4. The billboard as claimed in claim 1, wherein each of the pattern units comprises nine equal-area pattern cells, the pattern cells are arranged in rows and columns, and the number of pattern cells arranged in each row is equal to the number of pattern cells arranged in each column.

5. The billboard as claimed in claim 4, wherein the pattern cells of all of the pattern units are selectively combined to form nine independent pictures.

6. The billboard as claimed in claim 1, wherein the plurality of light sources are light emitting diodes.

7. The billboard as claimed in claim 1, wherein the second-order surface of each lens is a hyperboloid surface or a paraboloid surface.

8. The billboard as claimed in claim 1, wherein the at least first, second, third and fourth pattern cells are equal-area and arranged in rows and columns, and the number of pattern cells arranged in each row is equal to the number of pattern cells arranged in each column.

9. The billboard as claimed in claim 1, wherein the first parts of the planar surfaces of all the lenses cooperatively together display the first picture, the second parts of the planar surfaces of all the lenses cooperatively together displaying the second picture, the third parts of the planar surfaces of all the lenses cooperatively together displaying the third picture, the fourth parts of the planar surfaces of all the lenses cooperatively together displaying the fourth picture.

10. A billboard, comprising:

a substrate having a first surface and a second surface at opposite sides thereof;

a plurality of pattern units formed on the first surface of the substrate or formed in the substrate, each of the pattern units comprising at least first, second, third and fourth pattern cells arranged in a matrix, the at least first pattern cells of the pattern units together forming a first picture, the at least second pattern cells of the pattern units together forming a second picture, the at least third pattern cells of the pattern units together forming a third picture and the at least fourth pattern cells of the pattern units together forming a fourth picture;

a lens array corresponding to the pattern units arranged on the second surface of the substrate, the lens array displaying images of the first, second, third and fourth pictures at different viewing angles, respectively, wherein the lens array comprises a plurality of lenses arranged in rows and columns, and each of the lenses comprises a second-order surface through which light rays are output from the lens and a planar surface thorough which the light rays enter the lens, the planar surface being located facing a corresponding pattern unit, the planar surface being divided by at least two reference surfaces in the each of the lenses into at least first, second, third and fourth parts which are arranged in a matrix and located corresponding to the at least first, second, third and fourth pattern cells of the corresponding pattern unit, the at least first and second reference surfaces having different focuses;

a wedge-shaped light guide plate disposed facing the first surface of the substrate, the wedge-shaped light guide plate having an incident surface; and at least one light source disposed facing the incident surface of the wedge-shaped light guide plate.

11. The billboard as claimed in claim 10, wherein the planar surface of each of the lenses is opposite to the second-order surface.

12. The billboard as claimed in claim 10, wherein the second-order surface of each lens is an ellipsoid surface.

13. The billboard as claimed in claim 10, wherein the second-order surface of each lens is a hyperboloid surface or a paraboloid surface.

14. The billboard as claimed in claim 10, wherein each of the pattern units comprises nine equal-area pattern cells, the pattern cells are arranged in rows and columns, and the number of pattern cells arranged in each row is equal to the number of pattern cells arranged in each column.

15. The billboard as claimed in claim 14, wherein the pattern cells of all of the pattern units are selectively combined to form nine independent pictures.

16. The billboard as claimed in claim 10, wherein the at least one light source comprises a light emitting diode.

17. The billboard as claimed in claim 10, wherein the at least first, second, third and fourth pattern cells are equal-area and arranged in rows and columns, and the number of pattern cells arranged in each row is equal to the number of pattern cells arranged in each column.

18. The billboard as claimed in claim 10, wherein the first parts of the planar surfaces of all the lenses cooperatively together display the first picture, the second parts of the planar surfaces of all the lenses cooperatively together displaying the second picture, the third parts of the planar surfaces of all the lenses cooperatively together displaying the third picture, the fourth parts of the planar surfaces of all the lenses cooperatively together displaying the fourth picture.

* * * * *